(12) United States Patent
Elteto

(10) Patent No.: US 7,263,606 B2
(45) Date of Patent: Aug. 28, 2007

(54) METHOD AND APPARATUS FOR SOFTWARE PROTECTION VIA MULTIPLE-ROUTE EXECUTION

(75) Inventor: Laszlo Elteto, Irvine, CA (US)

(73) Assignee: SafeNet, Inc., Belcamp, MD (US)

( * ) Notice: Subject to any disclaimer, the term of this patent is extended or adjusted under 35 U.S.C. 154(b) by 517 days.

(21) Appl. No.: 10/782,038

(22) Filed: Feb. 19, 2004

(65) Prior Publication Data
US 2004/0168151 A1 Aug. 26, 2004

Related U.S. Application Data

(60) Provisional application No. 60/449,911, filed on Feb. 25, 2003.

(51) Int. Cl.
G06F 9/24 (2006.01)
G06F 21/22 (2006.01)
(52) U.S. Cl. ................. 713/2; 726/2; 726/26
(58) Field of Classification Search ............ 713/1, 713/2, 100; 726/2, 21, 26–33
See application file for complete search history.

(56) References Cited

U.S. PATENT DOCUMENTS

| 5,754,763 | A | * | 5/1998 | Bereiter | 726/28 |
| 6,463,538 | B1 | | 10/2002 | Elteto | |
| 6,523,119 | B2 | | 2/2003 | Pavlin et al. | |
| 6,615,359 | B2 | * | 9/2003 | Eyres et al. | 726/33 |
| 6,654,954 | B1 | * | 11/2003 | Hicks | 717/162 |
| 6,968,384 | B1 | * | 11/2005 | Redding et al. | 709/229 |

OTHER PUBLICATIONS

Chapter Seven,"SENTINEL SuperPro—Developer's Guide", Rainbow Technologies, Inc., pp. 141-168, published 2000-2001.

* cited by examiner

*Primary Examiner*—Dennis M. Butler
(74) *Attorney, Agent, or Firm*—Drinker, Biddle & Reath, LLP

(57) ABSTRACT

A method, apparatus, and article of manufacture for protecting a shelled computer program with a startup code featuring multiple-route execution. In one embodiment, the startup code comprises a sequence of tasks, collectively executing a startup code, wherein one or more of the tasks is selectably performed by one of a plurality of task code variations as selected by a selection code associated with the task.

37 Claims, 9 Drawing Sheets

METHOD AND APPARATUS FOR SOFTWARE PROTECTION VIA MULTIPLE-ROUTE EXECUTION

CROSS-REFERENCE TO RELATED APPLICATIONS

This application claims benefit of U.S. Provisional Patent Application No. 60/449,911, entitled "SOFTWARE PROTECTION METHOD WITH MULTIPLE-ROUTE EXECUTION," by Laszlo Elteto, filed Feb. 25, 2003, which application is hereby incorporated by reference herein.

BACKGROUND OF THE INVENTION

1. Field of the Invention

The present invention relates to systems and methods for protecting software from unauthorized copying and/or execution, and in particular to a system and method that protects software via multiple-route execution.

2. Description of the Related Art

Software piracy is a long-standing problem for software developers. Many techniques for discouraging software privacy have been developed. Products are available for those who lack either the time or the specialized expertise to secure their software applications from unauthorized copying and/or use (such products are available from RAINBOW TECHNOLOGIES, INC., the assignee of the present invention). Such products use software protection techniques that can be categorized into two forms: link-in object modules and shelling technology.

Link-in modules require that the developer modify the software code to call specific functions that check for license conditions. Consequently, this technique is sometimes referred to as "manual" protection.

Shelling does not require code changes, and is therefore easier for the software developer to implement. With the shelling technique, a shell process reads the application and produces a modified, new executable which contains an outer layer of protection code (with the original executable code usually encrypted inside). This method is often called "automatic" protection.

The problem with shelling is that the software program is protected only by the outer layer of protection. Consequently, a hacker can gain access to the protected application "just" by cracking the outer layer of protection. Because this protection code executes before the original application code starts, it usually runs in a fixed, known pattern. A cracker can follow the code execution (for example, by running it under a debugger), and once the code execution sequence is understood, the cracker can modify the code (for example, by patching the executable) to bypass/disable license checking.

What is needed is a software shelling technique that resists cracking. The present invention satisfies that need.

SUMMARY OF THE INVENTION

To address the requirements described above, the present invention discloses a method, apparatus, article of manufacture for protecting a shelled computer program.

In one embodiment, the startup code comprises a sequence of tasks, collectively executing a startup code, wherein one or more of the tasks is selectably performed by one of a plurality of task code variations as selected by a selection code associated with the task. In another embodiment, the startup code comprises a plurality N of startup code tasks $T_1, T_2, \ldots, T_N$ to be performed to execute the startup code; a plurality K of startup task code variations $T_{i,1}, T_{i,2}, \ldots, T_{i,K}$ for at least one $T_i$ of the plurality startup code tasks $T_1, T_2, \ldots, T_N$; and a selection routine $S_i$ for the at least one $T_i$ of the plurality of startup code tasks $T_1, T_2, \ldots, T_N$, the selection routine $S_i$ for selecting at least one $T_{i,j}$ of the K plurality of code variations $T_{i,1}, T_{i,2}, \ldots, T_{i,K}$ from among the plurality of code variations $T_{i,1}, T_{i,2}, \ldots, T_{i,K}$.

The method comprises the steps of generating a plurality N of startup task routines $T_1, T_2, \ldots, T_N$ collectively forming the startup code; generating a plurality K of startup task routine variations $T_{i,1}, T_{i,2}, \ldots, T_{i,K}$ for a chosen startup task routine $T_i$ of the startup task routines $T_1, T_2, \ldots, T_N$; generating a selection routine $S_i$ for the chosen startup task routine $T_i$ of the startup task routines $T_1, T_2, \ldots, T_N$, each selection routine $S_i$ for selecting at least one of the startup task code variations $T_{i,1}, T_{i,2}, \ldots, T_{i,K}$ to perform the chosen startup task routine $T_i$; and assembling the secure startup code as a combination of the plurality of task routines $T_1, T_2, \ldots, T_N$ for the unchosen ones of the plurality of task routines, and the selection routine $S_i$ and plurality of task routine variations $T_{i,1}, T_{i,2}, \ldots, T_{i,K}$ for each of the chosen task routine $T_i$ of the plurality task routines $T_1, T_2, \ldots, T_N$.

In another embodiment, the method comprises the steps of selecting a startup task code variation from among a plurality of startup task code variations, each startup code task variation performing a startup code task differently than the other startup code task variations, the startup code task belonging to a sequence of startup code tasks collectively performing the startup code; and executing the selected startup task code variation.

The article of manufacture comprises a data storage device tangibly embodying instructions to perform the methods described above.

The foregoing creates multiple execution paths within the startup code, thus requiring a cracker to step through the startup code a large number of times to exercise each execution path so that the entire startup code can be characterized. Thus, the cracker must examine much more code and would have to disable multiple points of license checking. This greatly increases the time and effort that must be devoted to cracking the startup code, and will deter many crackers from tampering with protected programs.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
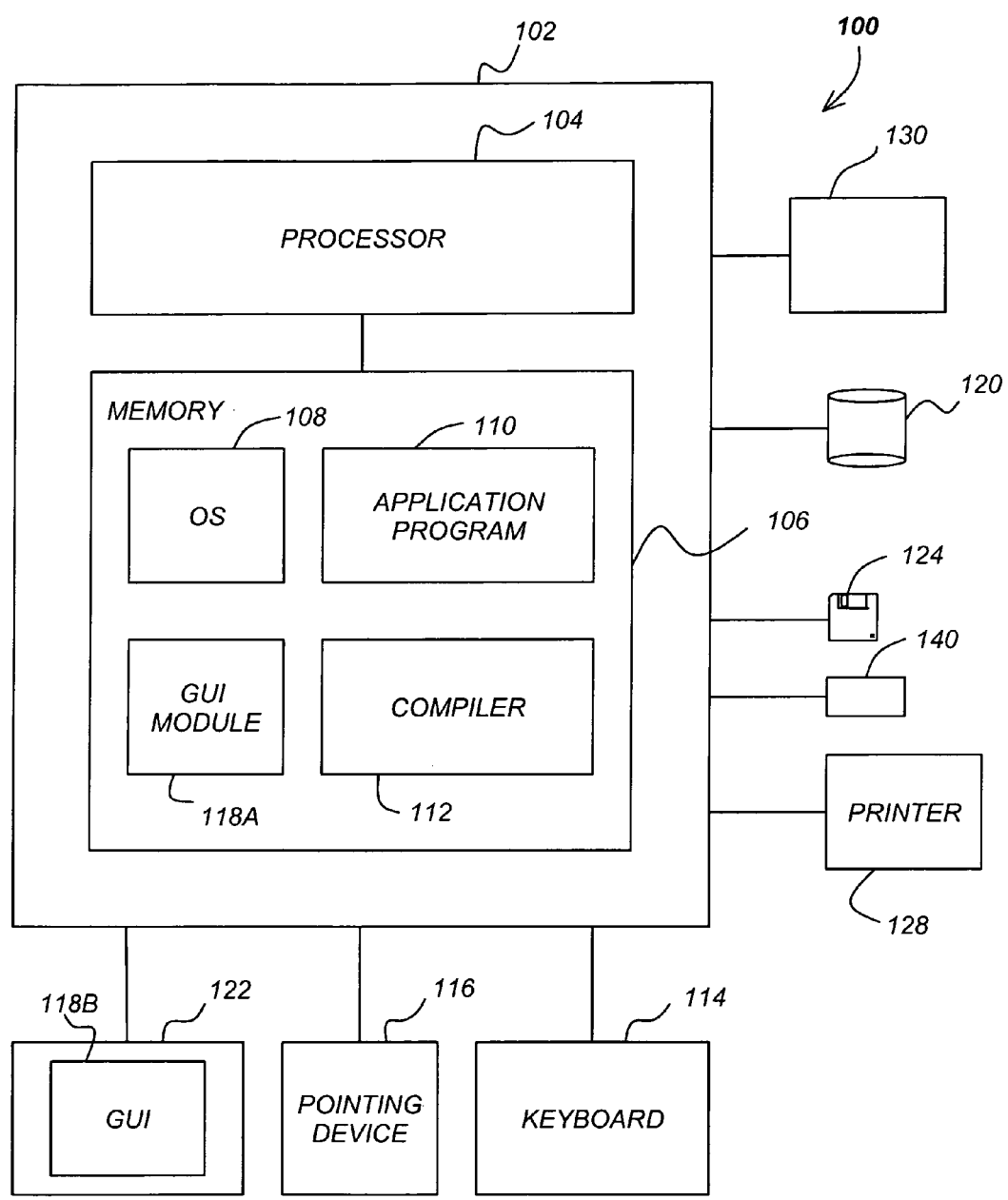
FIG. 1 is a block diagram showing an exemplary hardware environment for practicing the present invention.

FIG. 1 illustrates an exemplary computer system 100 that could be used to implement the present invention. The computer 102 comprises a processor 104 and a memory, such as random access memory (RAM) 106. The computer 102 is operatively coupled to a display 122, which presents images such as windows to the user on a graphical user interface 118B. The computer 102 maybe coupled to other devices, such as a keyboard 114, a mouse device 116, a printer, etc. Of course, those skilled in the art will recognize that any combination of the above components, or any number of different components, peripherals, and other devices, maybe used with the computer 102.

Generally, the computer 102 operates under control of an operating system 108 stored in the memory 106, and interfaces with the user to accept inputs and commands and to present results through a graphical user interface (GUI) module 118A. Although the GUI module 118A is depicted as a separate module, the instructions performing the GUI functions can be resident or distributed in the operating system 108, the computer program 110, or implemented with special purpose memory and processors. The computer 102 also implements a compiler 112 which allows an application program 110 written in a programming language such as COBOL, C++, FORTRAN, or other language to be translated into processor 104 readable code. After completion, the application 110 accesses and manipulates data stored in the memory 106 of the computer 102 using the relationships and logic that was generated using the compiler 112. The computer 102 also optionally comprises an external communication device such as a modem, satellite link, Ethernet card, or other device for communicating with other computers.

In one embodiment, instructions implementing the operating system 108, the computer program 110, and the compiler 112 are tangibly embodied in a computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of instructions which, when read and executed by the computer 102, causes the computer 102 to perform the steps necessary to implement and/or use the present invention. Computer program 110 and/or operating instructions may also be tangibly embodied in memory 106 and/or data communications devices 130, thereby making a computer program product or article of manufacture according to the invention. As such, the terms "article of manufacture," "program storage device" and "computer program product" as used herein are intended to encompass a computer program accessible from any computer readable device or media.

In one embodiment, the computer system 100 includes removably coupleable a hardware security module (HSM) such as a dongle, or hardware key 140. The HSM 140 is used to prevent unauthorized access to the computer 102 and/or the application programs 110. This can be accomplished by one or more of a variety of software protection paradigms. These could include, for example, a challenge-response protocol or other software protection techniques known in the art, including those disclosed in U.S. Pat. No. 6,523,119, issued Feb. 18, 2003 to Pavlin et al, which application is hereby incorporated by reference herein.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Figure 2:
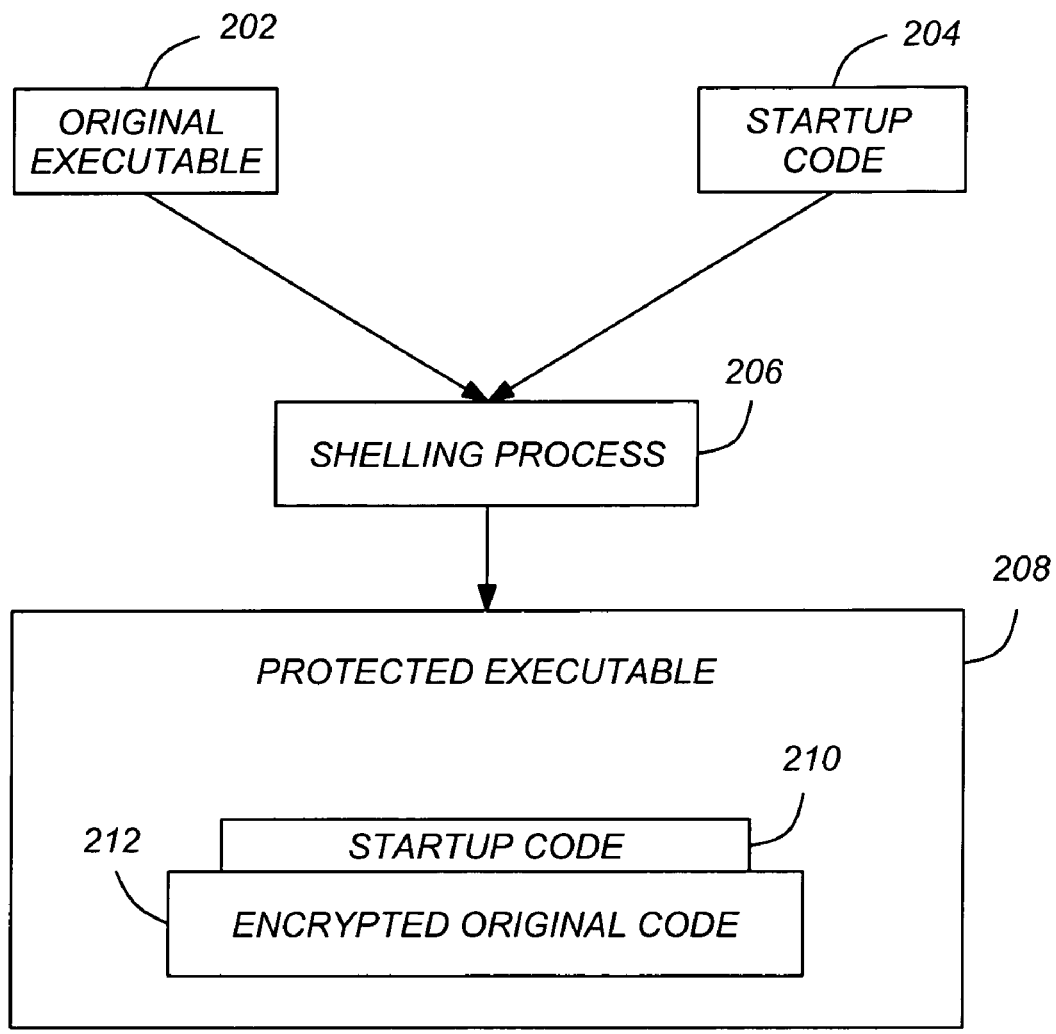
FIG. 2 is a diagram illustrating an exemplary shelling process used to protect a software application.

FIG. 2 is a diagram showing the generic shelling process. In the simplest form, a shelling process 206 accepts the original, unprotected executable file 202 and a startup code 204 and generates a new, protected executable file 208. An exemplary shelling process is described in chapter seven of "Sentinel SuperPro—Developer's Guide," published 2000-2001 by Rainbow Technologies Inc., which is also hereby incorporated by reference herein. The protected executable file 208 includes the startup code 210 and an encrypted version of the original executable code 212.

Figure 3:
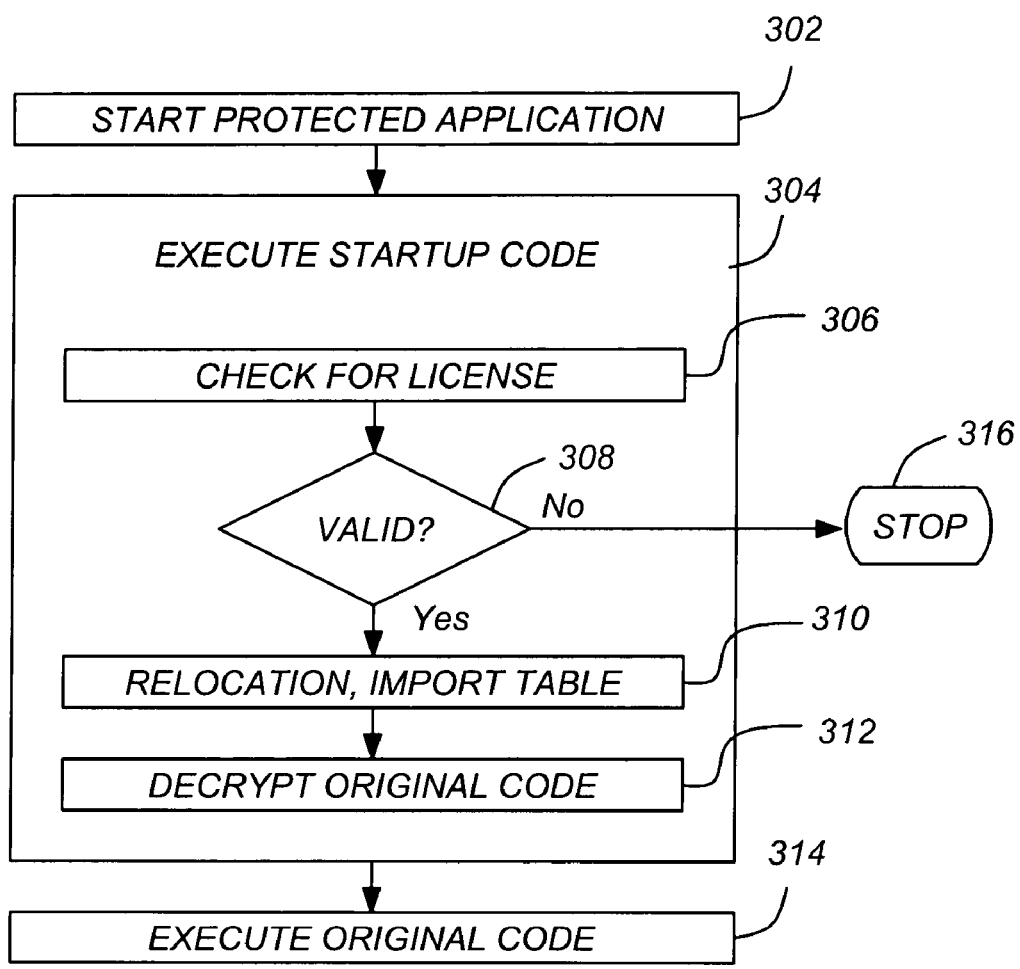
FIG. 3 is a diagram illustrating how a software application protected by the shelling process illustrated in FIG. 2 can be executed.

FIG. 3 is a diagram illustrating the execution of the protected executable file 208. In block 302, the execution of the protected executable 208 is started 302. The startup code 210 is executed 304. The startup code 210 performs one or more operations to determine whether execution of the protected executable is authorized. In one embodiment, this includes checking for a valid license condition from the HSM 140, as shown in block 306. If execution of the protected executable is not authorized (e.g. the HSM 140 is not present and/or provides an incorrect response to the challenge provided by the computer 102), the execution of the protected application 208 stops, as shown in blocks 308 and 316. If execution of the protected executable is authorized (e.g. if the HSM 140 is present and provides the correct response to the challenge provided by the computer 102), the encrypted executable code 212 is decrypted to produce the original executable code 202, as shown in block 312. The original executable code 202 is then executed, as shown in block 314. For WIN32-compatible executables, other housekeeping operations are performed, as shown in block 310. Such operations can include, for example, relocating data link libraries (DLLs), and setting up import tables as required.

Figure 4:
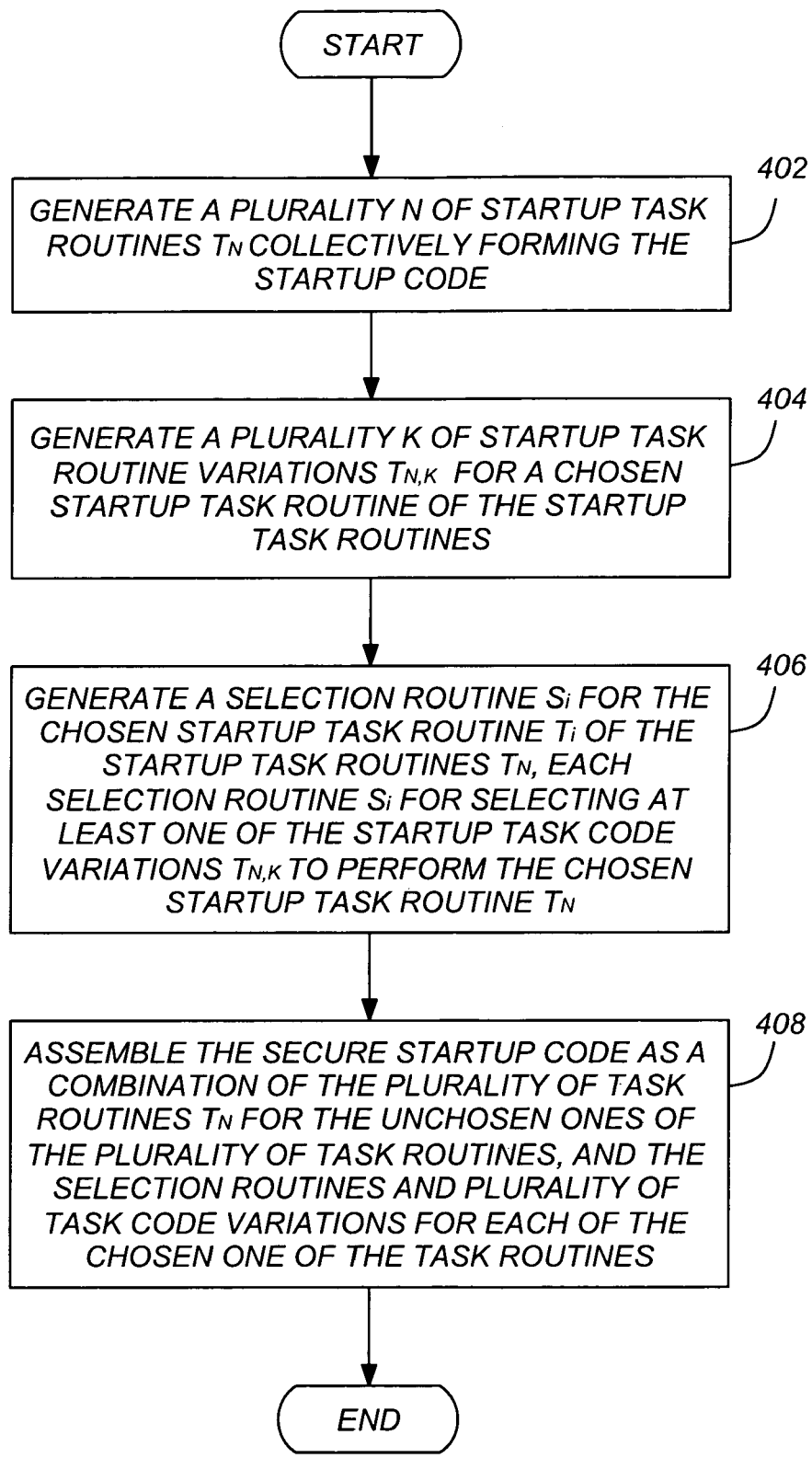
FIG. 4 is a diagram presenting exemplary method steps used to generate a multiple-execution path startup code.
Figure 5:
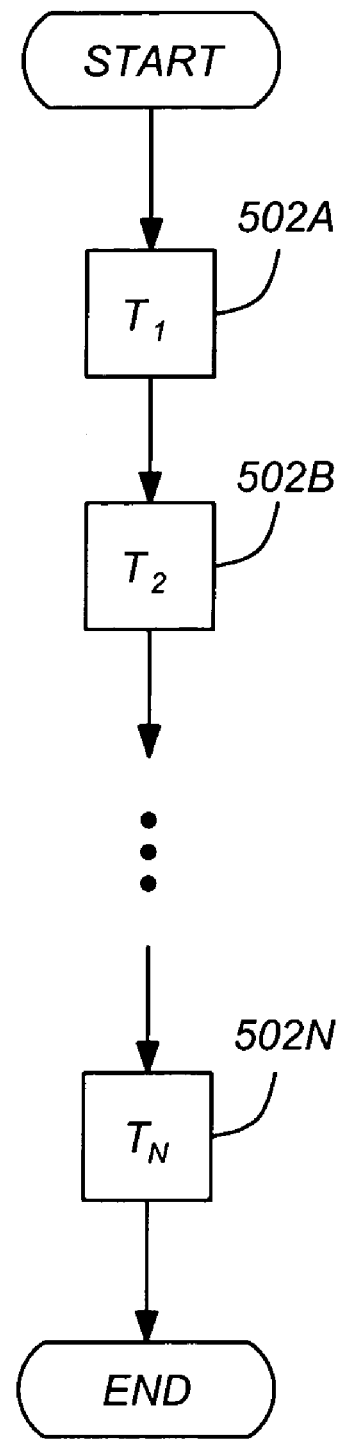
FIG. 5 is a diagram illustrating an exemplary unprotected startup code.
Figure 6:
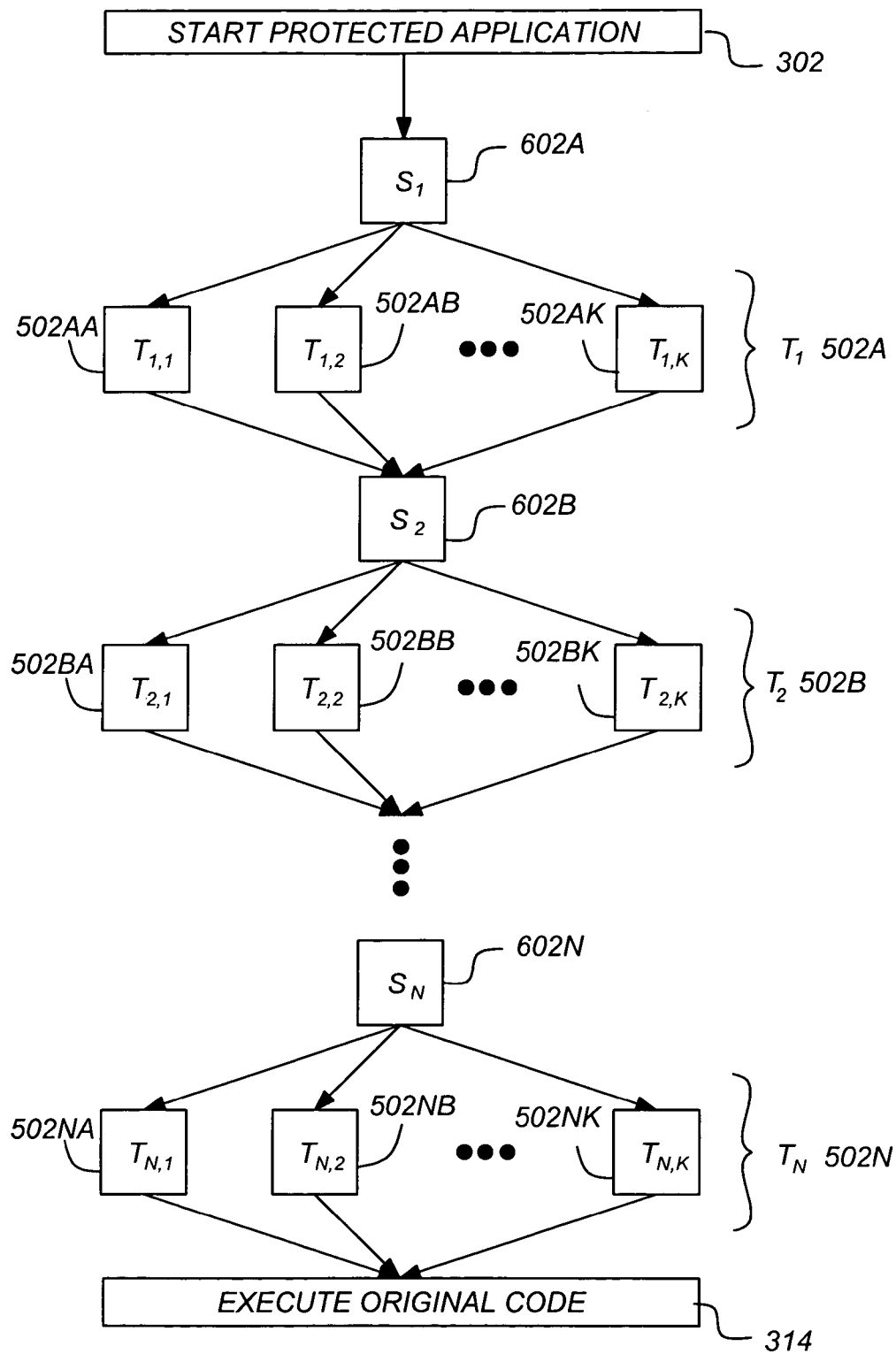
FIG. 6 is a diagram illustrating the operation and structure of one embodiment of the multiple execution path startup code.

FIG. 4 is a flow chart presenting illustrative method steps that can be used to practice one embodiment of the present invention. FIG. 4 will be described herein with reference to FIGS. 5 and 6. FIG. 5 is a diagram showing an exemplary embodiment of a startup code 204. As illustrated, the startup code comprises a plurality of sequentially executed tasks/steps/subtasks, such as a anti-debug code, self-decrypting routine, several substeps for checking license condition(s), decrypting the original code, preparing it to run (relocation, resolving import/export tables). FIG. 6 is a diagram illustrating the structure of the protected startup code created, for example, by performing the method steps shown in FIG. 4.

Referring to FIGS. 4, 5, and 6, a plurality N of startup task routines $T_1, T_2, \ldots T_N$ 502A-502N are generated, as shown in block 402. The plurality of startup task routines $T_1$, $T_2$, ... $T_N$ 502A-502N are generated collectively from the startup code 204. For example, the startup code 204 can comprise a series of sequentially executed task routines, as shown in FIG. 5. In this case, the startup code 204 can be separated into a first task routine $T_1$ 504A which performs a first task, a second task routine $T_2$ 504B, which performs a second task sequentially performed after the first task and a series of further task routines, up to and including an $N^{th}$ task routine $T_N$ 504N. The code developer can now choose one or more task routines $T_1$, $T_2$, ... $T_N$ 502A-502N that are to be implemented with a variety of functionally equivalent but computationally differing startup task code variations. Such task routines are referred to hereinafter as the "chosen" startup tasks, while those startup tasks that are not chosen to be variably implemented are referred to as "unchosen" startup tasks.

Referring again to FIG. 4, a plurality K of startup task routine variations $T_{N,K}$ are generated for a chosen startup task $T_i$ of the startup task routines $T_1$, $T_2$, ... $T_N$ 502A-502N. This is illustrated in block 404. An exemplary embodiment of the startup task routines $T_1$, $T_2$, ... $T_N$ 502A-502N and startup task routine variations $T_{1,1}$, ..., $T_{N,K}$ are shown in FIG. 6. In this example, K startup task variations $T_{1,1}$, 502AA, $T_{1,2}$ 502AB, ..., $T_{1,K}$ 502AK are generated for startup task $T_1$ 502A, K startup task variations $T_{2,1}$ 502BA, $T_{2,2}$ 502BB, ..., $T_{2,K}$ 502BK are generated for startup task $T_2$ 502B, and K startup task variations $T_{N,1}$ 502NA, $T_{N,2}$ 502NB, ..., $T_{N,K}$ 502NK are generated for startup task $T_N$ 502N. Each of the startup task variations $T_{N,1}$, $T_{N,2}$ ... $T_{N,K}$ perform the startup task $T_N$, but each does so using differently designed code. Preferably, the differences in code variations $T_{N,1}$, $T_{N,2}$ ... $T_{N,K}$ are sufficient so that someone attempting to crack the startup code must crack each of the startup code variations to crack the startup code itself, and information gleaned from cracking one of the startup code variations is of little or no use in cracking the remaining startup codes. These task code variations can be generated using the random code generation method described in U.S. Pat. No. 6,463,538 "Method of Software Protection Using a Random Code Generator", which is hereby incorporated by reference herein.

Returning to FIG. 4, a selection routine $S_i$ is generated for the chosen startup task routine $T_i$, as shown in block 406. Each selection routine $S_i$ selects at least one of the startup task code variations $T_{i,K}$ to perform the chosen startup task routine $T_i$. For example, supposing the selected startup task routine is $T_2$, selection routine $S_2$ 602B selects one of the startup code task variations $T_{2,2}$, ..., $T_{2,K}$ 502BB-502BK.

Finally, the secure startup code 210 is assembled as a combination of the plurality of task routines $T_N$ 502 for the unchosen one ones of the plurality of task routines, the selection routines $S_N$ 602, and the plurality of task code variations $T_{N,K}$ 502 associated with each of the chosen one of the task routines, as shown in block 408.

An exemplary assemblage is shown in FIG. 6. In this embodiment, the startup code 204 has been separated into a plurality of task routines $T_1$, $T_2$, ... $T_N$502A-502N, and a plurality of task code variations $T_{1,1}$, ..., $T_{N,K}$ 502AA-502NK have been generated for each of the plurality of task routines $T_1$, $T_2$, ... $T_N$502A-502N. A selection routine $S_1$, $S_2$, ..., $S_N$ 602A-602N has been generated for each generated task code variation $T_{1,1}$,...,$T_{N,K}$ 502AA-502NK. These elements have been assembled so that each of the tasks 502 are executed sequentially as they were in the original startup code shown in FIG. 5, and the selection routines 602 select which of the task code variations $T_{i,j}$ are used to execute each particular task.

For example, a first execution thread can comprise the execution of selection code $S_1$ 602A, task code variation $T_{1,2}$ 502AB, selection code $S_2$ 602, task code variation $T_{2,K}$502BK, selection routine $S_N$ 602N, and task code variation $T_{N,1}$. A second execution thread can include selection routine $S_1$ 602A, task code variation $T_{1,1}$ 502AA, selection routine $S_2$ 602B, task code variation $T_{2,2}$ 502BB, selection code $S_N$ 602N, and task code variation $T_{N,K}$ 502NK. This process can continue, with each of the selection routines $S_N$ 602 selecting different task code variations $T_{N,K}$, thus implementing the startup code 204 with randomly selected code. Such "random" selections are typically implemented by using an algorithmically-generated number. Although the numbers generated by such algorithms appear random, they are in fact reproducible, and therefore "pseudorandom" instead of truly "random." In this disclosure, the terms "random" and "pseudorandom" are functionally synonymous, and refer to selections that may or may not be equally probable, and that are for practical purposes, random enough to achieve the objectives of the present invention.

The number of task code variations $T_{1,1}$-$T_{N,K}$ 502AA-502NK that are generated for each subtask $T_1$, $T_2$, ..., $T_N$ 502A, 502B, ..., 502N is a sufficiently large number so that a software cracker would be faced with a sufficiently large number of different task code variations 502 and different execution threads. The actual number selected depends upon the level of security desired. Typically, 50-100 task code variations $T_{i,j}$ 502AA-502NK are generated for each task code.

As described above, all of the startup task routines $T_1$, $T_2$, ..., $T_N$ 502A, 502B, ..., 502N can be implemented by the same number (K, in the foregoing example) of task code variations $T_{1,1}$-$T_{N,K}$ 502AA-502NK. However, if desired, a different number of startup task code variations $T_{N,K}$ can be generated for one or more of the startup tasks $T_N$ 502. This adds another area of uncertainty, making it more difficult to crack the software code. Also, a particular startup task may be implemented with no variations (and hence, no selection routine is required to choose from among the startup code variations $T_{N,K}$). The selection routines $S_i$ 602 may select from among the associated startup task code variations $T_{i,j}$ in a variety of ways. In one embodiment, the selection routine $S_i$ pseudorandomly selects from among the associated startup code variations $T_{i,j}$ (e.g. by generation of a random number). If desired, the probabilities of selecting any particular one(s) of the task code variations $T_{i,j}$ is much less likely than others of the task code variations. This can make it quite difficult for the cracker to assure that each and every one of the task code variations have been cracked, making a cracked application much less marketable for purposes of software piracy.

The startup code 204 may also include tasks that are performed in parallel instead of in series as shown in FIG. 5. In this situation, the related subtasks and associated selection routines may also be performed in parallel.

In another embodiment, instead of randomly selecting the next $T_{i,j}$ task variation at each point, task code variations are selected based on a function of time. For example, if the current time is t, the selection routine can use a selection function $f(i, t)=x$ to select which of the task code variations $T_{i,j}$ is selected. Using this technique, the selected sequence of task code variations will be $T_{1,x_1}$, $T_{2,x_2}$, ..., $T_{N,x_N}$. To increase resistance against cracking, some of the tasks perform a check, using the function $f(i, t)$ and the knowledge of the current time t, to make sure that the proper task code variation $T_{i,j}$ was selected. If the proper task was not selected (for example, if the cracker compromised or bypassed one or more of the selection routines) the startup code will abort.

In yet another embodiment, instead of randomly selecting the next task, one or more selection routines can select the task code variation based on the computer configuration (for example, using computer-related information such as CPU type, hardware configurations, and/or other factors). To implement this embodiment the computer configuration information can be collected and condensed into a "computer fingerprint" or other value $F_p$. A computer fingerprint is a unique computer identifier, analogous to a human fingerprint. The computer signature represents a unique digital signature for the computer and is typically generated by a pseudorandomly processed combination of the computer's hardware components or resident software components. One or more of the selection routines can implement a selection function be $g(i, F_p)=y$. The selection routine can implement the startup code by executing a thread $T_{1,y_1}$, $T_{2,y_2}$, ..., $T_{N,y_N}$. In this embodiment the selection routines $S_1$, $S_2$, ..., $S_N$ 602A-602N of FIG. 6 and the selection routines $S_1$, 802A and $S_{2,1}$-$S_{N,K}$ 802BA-802NK can be performed by a single selection routine that enters the thread where appropriate to select the next task $T_i$ 502 or task variation $T_{i,j}$ 502 to be performed. In this case, on a given computer the protected program always runs the same way—so a cracker will patch only that one code path. When the cracked program is copied to another computer it will select a different code execution path and the crack will be ineffective, that is, the protected program will again check for the license condition. Moreover, since the execution path is computer dependent the cracker would need to test a cracked software on many computers—and probably will still miss all execution thread or path variations.

A combination of the foregoing techniques can also be employed. For example, some of the task code variation selections can be made completely randomly, others may be time-based (and the selected routine checks that it is the one it should have been selected) and some task code variations selections based on the computer configuration (so the execution path will change only if the program is run on a different computer). Further, how such task code selections are made in each instance can itself be determined pseudorandomly.

Figure 7:
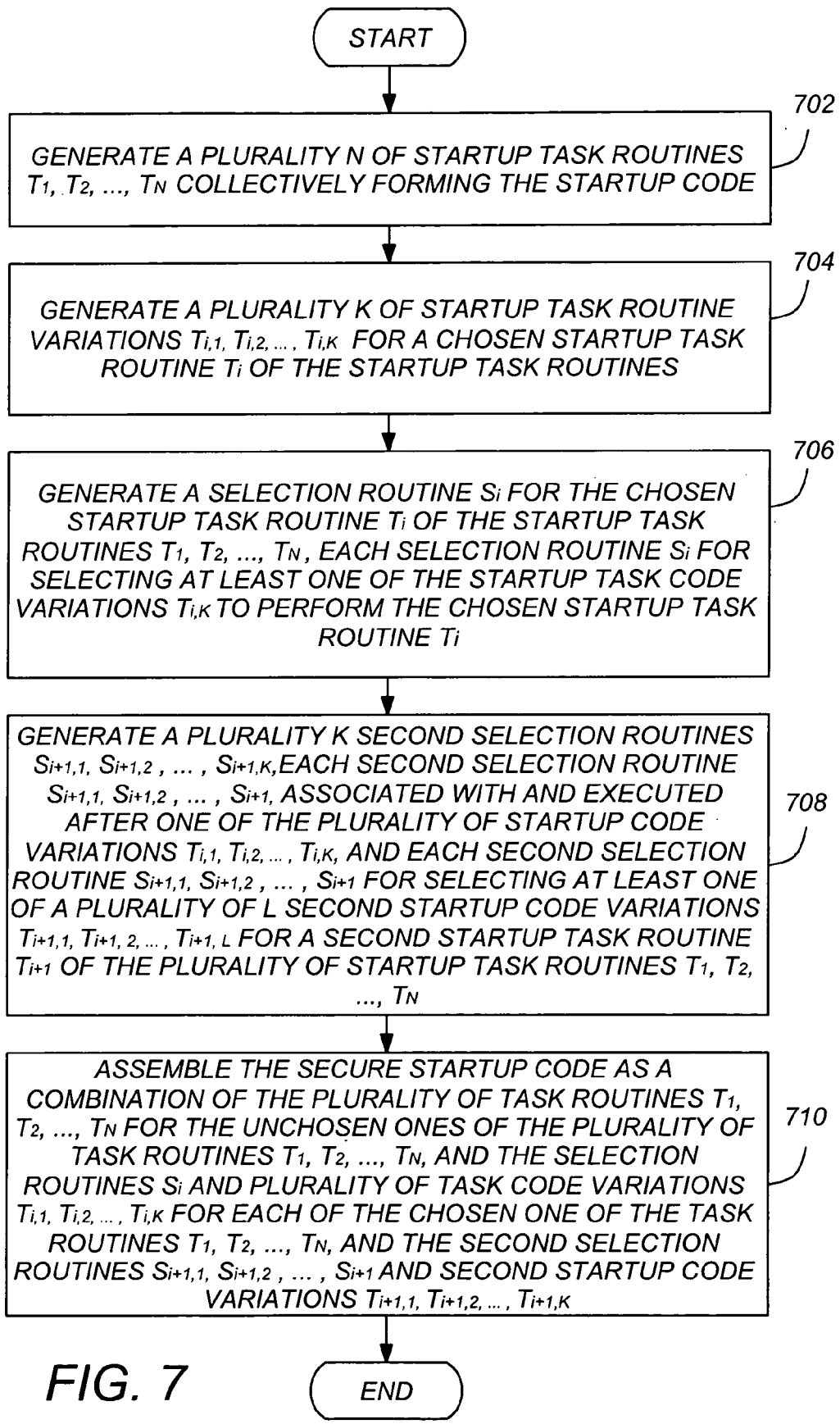
FIG. 7 is a flow chart illustrating another embodiment of the present invention, in which single decision points implemented by selection routines are avoided.
Figure 8:
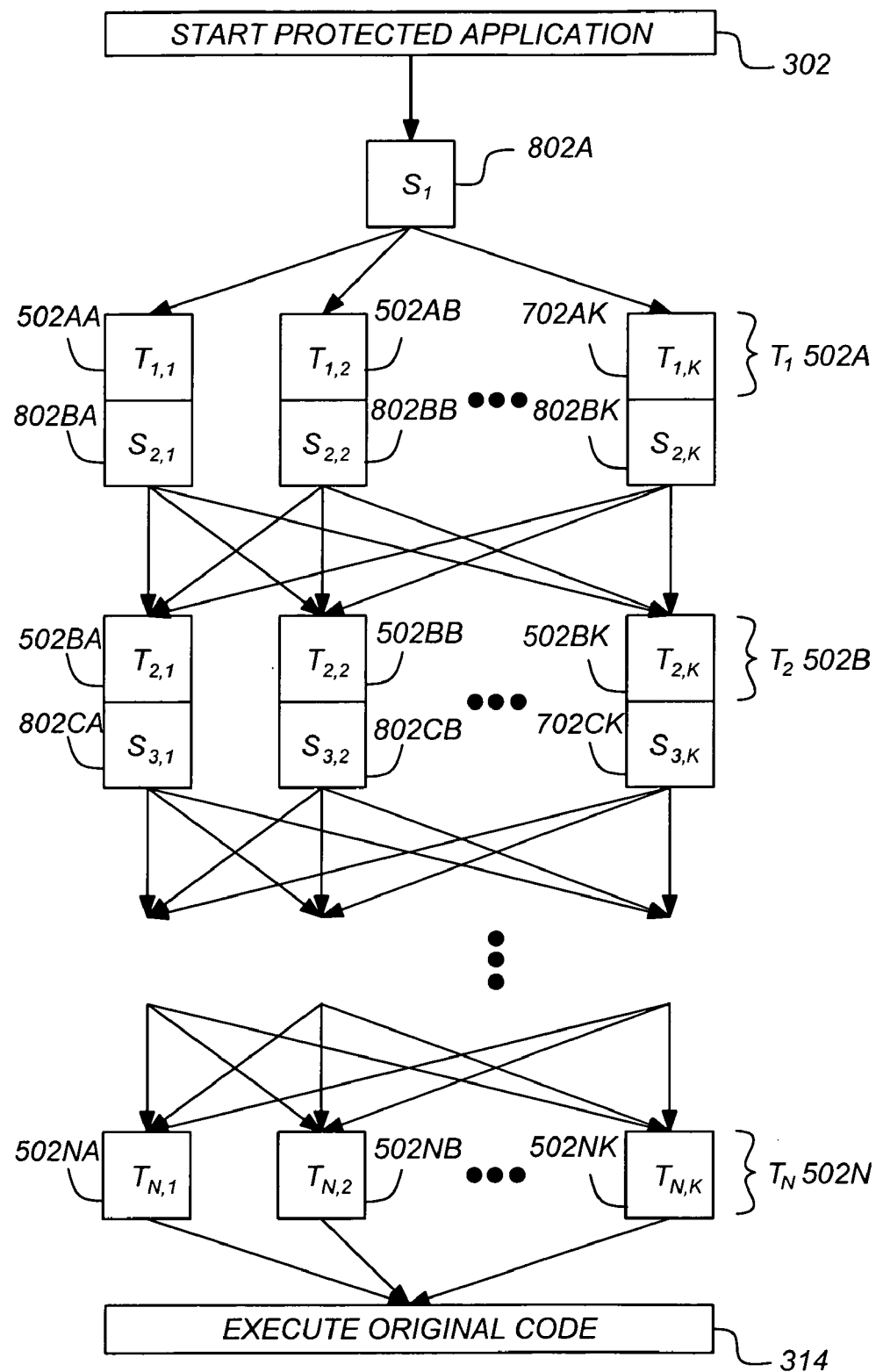
FIG. 8 is a diagram illustrating the structure of the protected startup code created, for example, by performing the technique shown in FIG. 7.

FIG. 7 is a flow chart illustrating another embodiment of the present invention. In this embodiment, single decision points are avoided. Instead of employing a single selection routine $S_i$ after a task $T_{i-1}$, a plurality of selection routines $S_{i,j}$ is appended and performed after each associated task $T_{i,j}$. FIG. 8 is a diagram illustrating the structure of the protected startup code 204 created, for example, by performing the method steps shown in FIG. 7.

Referring now to FIG. 7, a plurality of N startup task routines $T_1$-$T_N$ 502A-502N are generated. This is illustrated in block 702. The startup task routines $T_1$-$T_N$ 502A-502N collectively form the startup code 204. A plurality K of startup task routine variations $T_{i,1}$, $T_{i,2}$, ..., $T_{i,K}$ are generated for one or more chosen startup task routines of the plurality of startup task routines $T_1$-$T_N$ 502A-502N. This is illustrated in block 704. In the embodiment illustrated in FIG. 8, K task code variations are generated for each of the startup task routines $T_1$-$T_N$ 502A-502N.

In block 706, a selection routine $S_i$ is generated for the chosen startup task routines $T_i$ of the startup task routines $T_1$-$T_N$ 502A-502N. Each selection routine $S_i$ selects at least one of the startup task code variations $T_{i,j}$ to perform the chosen startup task routine $T_i$.

In block 708, a plurality of K second selection routines $S_{i+1,1}$, $S_{i+1,2}$, ..., $S_{i+1,K}$ are generated. Each of the K second selection routines $S_{i+1,1}$, $S_{i+1,2}$, ..., $S_{i+1,K}$ is associated with and executed after one of the plurality startup code variations $T_{i,1}$, $T_{i,2}$, ..., $T_{i,K}$. Also, each of the K second selection routines $S_{i+1,1}$, $S_{i+1,2}$, ..., $S_{i+1,K}$ selects at least one of a plurality L of second startup code variations $T_{i+1,1}$, $T_{i+1,2}$, ..., $T_{i+1,L}$ for a second startup task routine $T_{i+1}$ of the plurality of startup task routines $T_1$-$T_N$ 502A-502N. In the embodiment illustrated in FIG. 8, the number of second startup code variations $T_{i+1,1}$, $T_{i+1,2}$, ..., $T_{i+1,L}$ is equal to the number of second selection routines $S_{i+1,1}$, $S_{i+1,2}$, ..., $S_{i+,K}$ (e.g. L=K), however, this need not be the case.

Finally, in block 710, the secure startup code 204 is assembled as a combination of the plurality of task routines for the unchosen ones of the plurality of task routines $T_1$, $T_2$, ..., $T_N$, the selection routine $S_i$ and plurality of task routine variations $T_{i,1}$, $T_{i,2}$, ..., $T_{i,L}$ for each of the chosen ones of the task routines $T_1$, $T_2$, ..., $T_N$, and the second selection routines $S_{i+1,1}$, $S_{i+1,2}$, ..., $S_{i+1,K}$ and second startup code variations $T_{i+1,1}$, $T_{i+1,2}$, ..., $T_{i+1,l}$.

FIG. 8 presents an exemplary embodiment of the assembled secure startup code 204. In this example, the chosen startup task is task $T_1$ 502A, and selection routine $S_1$ 802A will select a startup task code variation $T_{1,1}$, $T_{1,2}$, ..., $T_{1,K}$. The selected startup task code variation $T_i$ is executed, and the selection routine $S_i$ associated with the startup task code variation $T_i$ then selects one of the second startup code variations $T_{i,1}$, $T_{i,2}$, ..., $T_{i,L}$ to continue the thread.

Figure 9:
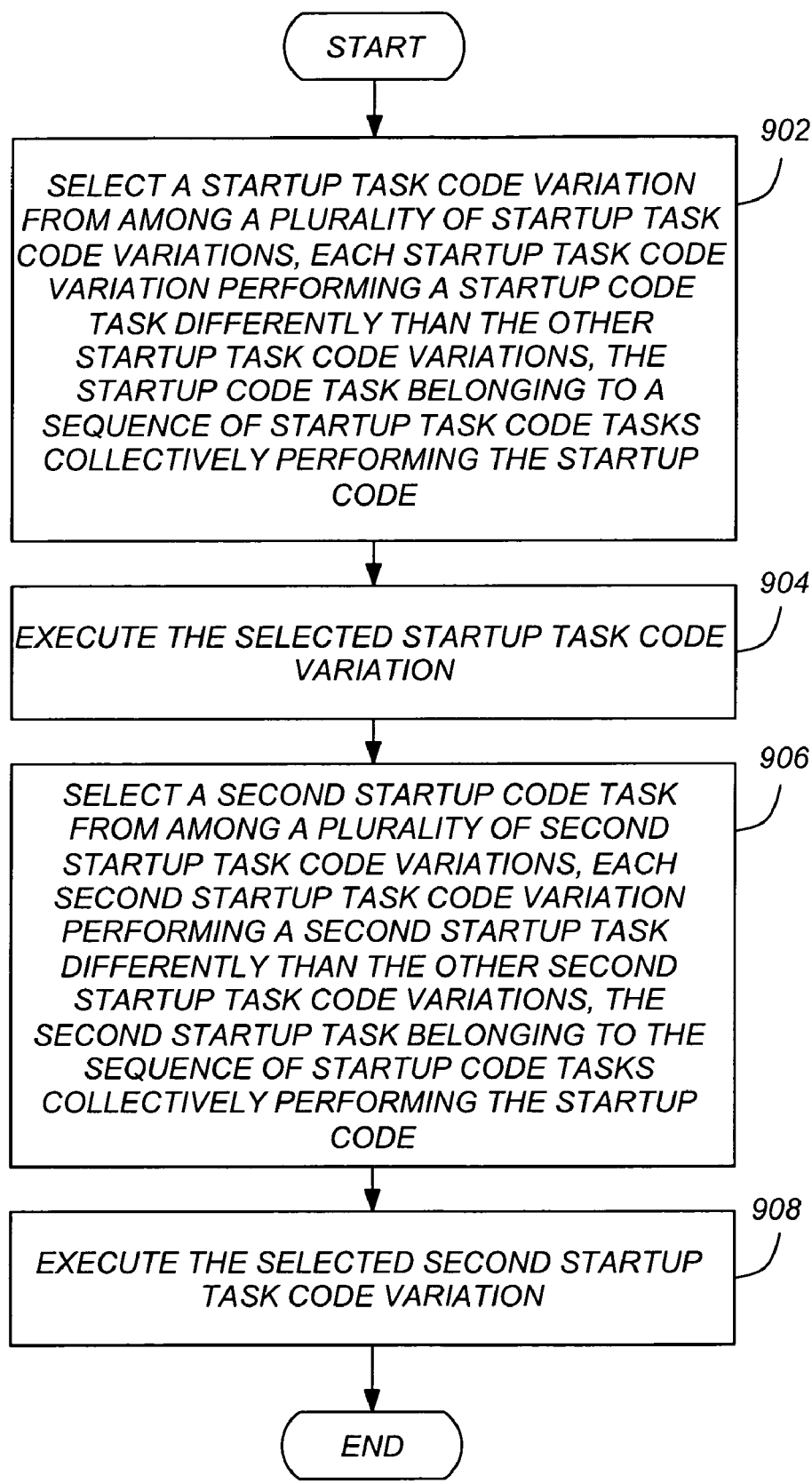
FIG. 9 is a flow chart illustrating the operation of one embodiment of the completed startup code.

FIG. 9 is a flow chart illustrating the execution of a startup code 204. Upon initial execution of the protected application, a startup code variation $T_{i,j}$ is selected from the plurality of startup code variations $T_{1,1}$-$T_{N,K}$ 502AA-502NK, as shown in block 902. As described above, the startup code tasks $T_1$, $T_2$, ..., $T_N$ 502A, 502B, ..., 502N collectively perform the startup code 204, and each of the startup code task variations $T_{1,1}$-$T_{N,K}$ 502AA-502NK performs an associated startup code task $T_1$, $T_2$, ..., $T_N$ 502A, 502B, ..., 502N differently than the other associated startup task code variations.

For example, referring to FIG. 6, after the protected application is started, as shown in block 302, selection routine $S_1$ 602A selects one of the associated task code variations $T_{1,1}$-$T_{1,K}$ 502AA-502AK to perform task $T_1$ 502A. The selected task code variation (e.g. for exemplary purposes, task code variation $T_{1,2}$ 502AB) is executed to perform task $T_1$ 502A. In the embodiment shown in FIG. 6, this process is repeated for each remaining startup code task $T_2$, $T_3$, ..., $T_N$ 502B, 502C, ..., 502N. In cases where the multiple task code variations are available to perform the related task, a selection routine selects which task code variation will perform the task, and in cases where the task is performed by a single task code (e.g. the software designer has not chosen to implement multiple task code variations for this particular task), the task code itself is executed.

Referring back to FIG. 9, a second selection routine (e.g. task $S_2$ 602B) selects one of among a second plurality second task code variations (e.g. task code variations $T_{2,1}$, $T_{2,2}$, ..., $T_{2,K}$ 502BA-502BK to perform startup task $T_2$ 502B, and the selected startup task code variation (e.g. task code variation $T_{2,1}$ 502BA) is executed to perform the task. This is illustrated in blocks 906 and 908.

FIG. 8 illustrates another embodiment of a startup code task 204. In this case, a first selection routine $S_1$ 802A selects one of the startup task code variations $T_{1,1}, T_{1,2}, \ldots, T_{1,K}$ to perform startup task $T_1$ 502A, and a second selection routine (e.g. one of selection routines $S_{2,1}, S_{2,2}, \ldots, S_{2,K}$ 802BA-802BK) selects one of the second startup code task variations (e.g. $T_{2,1}, T_{2,2}, \ldots, T_{2,K}$ 502BA-502BK). The selected second startup code task executes the startup code task variation to execute the task.

In the embodiment shown in FIG. 6, the selection of the second startup code task variation is performed by executing a single selection routine $S_2$ 602B associated with each of the preceding startup code task variations $T_{1,1}, T_{1,2}, \ldots, T_{1,K}$ 502AA-502AK and all of the following second startup code task variations $T_{2,1}, T_{2,2}, \ldots, T_{2,K}$ 502BA-502BK. However, in the embodiment shown in FIG. 8, the selection of the second startup task code variation $T_{2,1}, T_{2,2}, \ldots, T_{2,K}$ 502BA-502BK is performed by executing a selection routine associated with the selected startup task code variation and the second startup task code variations (e.g., if selection routine $S_1$ 802A selected startup code task variation $T_{1,2}$, 502AB selection routine $S_{2,2}$ 802BB, which is associated with and executed after startup code task variation $T_{1,2}$ 502AB selects one of the following startup code task variations $T_{2,1}, T_{2,2}, \ldots, T_{2,K}$ 502BA-502BK to perform task $T_2$ 502B).

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A startup code, embodied in a computer-readable medium, for protecting a shelled computer program, comprising: a sequence of tasks collectively executing the startup code; and
    wherein at least one task is selectably performed by a selected one of a plurality of task code variations as selected by a selection code associated with the at least one task.

2. The startup code of claim 1, wherein the selected one of the plurality task code variations is pseudorandomly selected.

3. The startup code of claim 1, wherein the selected one of the plurality of task code variations are selected based on a function of time.

4. The startup code of claim 1, wherein the selected one of the plurality of task code variations is selected based on a function of one or more parameters describing a computer executing the startup code.

5. The startup code of claim 4, wherein the one or more parameters includes a computer fingerprint.

6. The startup code of claim 1, wherein a second task of the sequence of tasks is selectably performed by a selected one of a plurality of second task code variations as selected by a second selection code associated with second task.

7. The startup code of claim 1, wherein a second task of the sequence of tasks is selectably performed by a selected one of a plurality of second task code variations as selected by a second selection code associated with the selected one of the plurality of second task code variations.

8. The startup code of claim 7, wherein the selected one of the plurality of second task code variations is pseudorandomly selected.

9. The startup code of claim 7, wherein the selected one of the plurality of second task code variations is selected based on a function of time.

10. The startup code of claim 7, wherein the selected one of the plurality of second task code variations is selected based on a function of one or more parameters describing a computer executing the startup code.

11. The startup code of claim 10, wherein the one or more parameters includes a computer fingerprint.

12. A startup code, embodied in a computer-readable medium, for protecting a shelled computer program, comprising: a plurality N of startup code tasks $T_1, T_2, \ldots T_N$ to be performed to execute the startup code;
    a plurality K of startup task code variations $T_{i,1}, T_{i,2}, \ldots, T_{i,K}$ for at least one $T_i$ of the plurality startup code tasks $T_1, T_2, \ldots T_N$; and
    a selection routine $S_i$ for the at least one $T_i$, of the plurality of startup code tasks $T_1, T_2, \ldots T_N$, the selection routine $S_i$ for selecting at least one $T_{i,j}$ of the K plurality of code variations $T_{i,1}, T_{i,2}, \ldots, T_{i,K}$ from among the plurality of code variations $T_{i,1}, T_{i,2}, \ldots, T_{i,K}$.

13. The startup code of claim 12, wherein the startup code tasks are to be performed in series.

14. The startup code of claim 12, wherein the selection routine pseudorandomly selects the one of the plurality of code variations from among the plurality of code variations.

15. The startup code of claim 12, wherein the selection routine selects one of the plurality of code variations from among the plurality of code variations according to a function of time.

16. The startup code of claim 12, wherein the selection routine selects one of the plurality of code variations from among the plurality of code variations according to a function of one or more parameters describing a computer executing the startup code.

17. The startup code of claim 16, wherein the one or more parameters includes a computer fingerprint.

18. The startup code of claim 12, further comprising:
    a plurality K of second selection routines $S_{i+1,1}, S_{i+1,2} \ldots S_{i+1,K}$ each second selection routine $S_{i+1,1}, S_{i+1,2}, \ldots S_{i+1,K}$ associated with and executed after one of the plurality of startup code variations $T_{i,K}$, and each second selection routine $S_{i+1,1}, S_{i+1,2}, \ldots S_{i+1,K}$ for selecting at least one of a plurality of L second startup code variations $T_{i+1, 1}, T_{i+1,2}, \ldots, T_{i+1,L}$, for a second startup code task $T_{i+1}$ of the plurality of startup code tasks $T_1, T_2, \ldots, T_N$.

19. The startup code of claim 18, wherein each of the plurality of second selection routines pseudorandomly selects the one of the plurality of second startup code variations from among the plurality of second startup code variations.

20. The startup code of claim 18, wherein each of the plurality of second selection routines selects one of the plurality of second startup code variations from among the plurality of second startup code variations according to a function of time.

21. The startup code of claim 18, wherein each of the plurality of second selection routines selects one of the plurality of second startup code variations from among the plurality of second startup code variations according to a function of one or more parameters describing a computer executing the startup code.

22. The startup code of claim 21, wherein the one or more parameters includes a computer fingerprint.

23. A method of generating a secure startup code for use in generating a shelled application program, comprising the steps of:
generating a plurality N of startup task routines $T_1, T_2, \ldots, T_N$ collectively forming the startup code;
generating a plurality K of startup task routine variations $T_{i,1}, T_{i,2}, \ldots, T_{i,K}$ for a chosen startup task routine $T_i$ of the startup task routines $T_1, T_2, \ldots, T_N$;
generating a selection routine $S_i$ for the chosen startup task routine $T_i$ of the startup task routines $T_1, T_2, \ldots, T_N$, each selection routine $S_i$ for selecting at least one of the startup task code variations $T_{i,1}, T_{i,2}, \ldots, T_{i,K}$ to perform the chosen startup task routine $T_i$; and
assembling the secure startup code in a computer-readable medium as a combination of the plurality of task routines $T_1, T_2, \ldots, T_N$ for the unchosen ones of the plurality of task routines, and the selection routine $S_i$ and plurality of task routine variations $T_{i,1}, T_{i,2}, \ldots, T_{i,K}$ for each of the chosen task routine $T_i$ of the plurality task routines $T_1, T_2, \ldots T_N$.

24. The method of claim 23, further comprising the step of separating the startup code into a series of task routines $T_1, T_2, \ldots T_N$.

25. The method of claim 23, wherein the selection routine $S_i$ pseudorandomly selects the one of the plurality of startup task routine variations $T_{i,1}, T_{i,2}, \ldots, T_{i,K}$.

26. The method of claim 23, wherein the selection routine $S_i$ selects the one of the plurality of startup routine variations $T_{i,1}, T_{i,2}, \ldots, T_{i,K}$ as a function of time.

27. The method of claim 23, wherein the selection routine $S_i$, selects the one of the plurality of startup routine variations $T_{i,1}, T_{i,2}, \ldots, T_{i,K}$ as a function of one or more parameters describing a computer executing the startup code.

28. The method of claim 27, wherein the one or more parameters includes a computer fingerprint.

29. The method of claim 23, wherein:
the method further comprises the steps of generating a plurality K second selection routines, each second selection routine $S_{i+1,1}, S_{i+1,2}, \ldots S_{i+1,K}$ associated with and executed after one of the plurality of startup code variations $T_{i,K}$, and each second selection routine $S_{i+1,1}, S_{i+1,2}, \ldots S_{i+1,K}$ for selecting at least one of a plurality of L second startup code variations $T_{i+1,1}, T_{i+1,2}, \ldots, T_{i+1,L}$ for a second startup task routine $T_{i+1}$ of the plurality of startup task routines $T_1, T_2, \ldots, T_N$; and
the secure startup code is assembled as a combination of the plurality of task routines for the unchosen ones of the plurality of task routines $T_1, T_2, \ldots T_N$, the selection routine $S_i$ and plurality of task routine variations $T_{i,1}, T_{i,2}, \ldots, T_{i,L}$ for each of the chosen ones of the task routines $T_1, T_2, \ldots T_N$, and the second selection routines $S_{i+1,1}, S_{i+1,2}, \ldots S_{i+1,K}$, and second startup code variations $T_{i+1,1}, T_{i+1,2}, \ldots, T_{i+1,L}$.

30. A method of executing a secure startup code comprising the steps of: selecting a startup task code variation from among a plurality of startup task code variations, each startup code task variation performing a startup code task differently than the other startup code task variations, the startup code task belonging to a sequence of startup code tasks collectively performing the startup code; and
executing the selected stamp task code variation.

31. The method of claim 30, wherein the startup task code variation is pseudorandomly selected.

32. The method of claim 30, wherein the startup task code variation is selected based on a function of time.

33. The method of claim 30, wherein the startup task code is selected as a function of one or more parameters describing a computer executing the startup code.

34. The method of claim 33, wherein the one or more parameters includes a computer fingerprint.

35. The method of claim 30 above, further comprising the steps of: selecting a second startup task code variation from among a plurality of second startup task code variations, each second startup code task variation performing a second startup code task differently than the other second startup code task variations, the second startup code task belonging to the sequence of startup code tasks collectively performing the startup code; and
executing the selected second startup task code variation.

36. The method of claim 35, wherein the step of selecting the second startup task code variation is performed by executing a selection routine associated each of the startup code task variations and the second startup code task variations.

37. The method of claim 35, wherein the step of selecting the second startup task code variation is performed by executing a selection routine associated with the selected startup task code variation and the second startup task code variations.

* * * * *